United States Patent [19]

Logan et al.

[11] Patent Number: 5,027,047
[45] Date of Patent: Jun. 25, 1991

[54] HALF ANGLE MECHANISM FOR A HELIOSTAT

[75] Inventors: Dale R. Logan, Bowie; Craig D. Walrath, Catonsville, both of Md.

[73] Assignee: Westinghouse Electric Corp., Pittsburgh, Pa.

[21] Appl. No.: 732,820

[22] Filed: May 10, 1985

Related U.S. Application Data

[63] Continuation of Ser. No. 417,750, Sep. 13, 1982, abandoned.

[51] Int. Cl.$^5$ .............................................. B64C 17/02
[52] U.S. Cl. ...................................... 318/648; 318/654
[58] Field of Search ............... 318/648, 649, 654, 655, 318/342, 676

[56] References Cited

U.S. PATENT DOCUMENTS

| | | | |
|---|---|---|---|
| 3,196,332 | 7/1965 | Branom | 318/648 X |
| 3,259,822 | 7/1966 | Burmeister | 318/648 X |
| 3,414,795 | 12/1968 | Weiser | 318/434 |
| 3,446,980 | 5/1969 | Meier | 250/231 R |
| 3,518,016 | 6/1970 | Burdin | 350/500 |
| 3,626,268 | 12/1971 | Dudley | 318/654 X |
| 3,951,510 | 4/1976 | Lloyd | 350/16 |
| 4,019,107 | 4/1977 | Dixon | 318/432 X |

Primary Examiner—Theodore M. Blum
Attorney, Agent, or Firm—W. G. Sutcliff

[57] ABSTRACT

An improved heliostat device for an electrooptical system in which a mirror is gimbaled in two axes for line-of-sight direction and stabilization. A half angle drive system is connected to the mirror for controlling azimuth rotation of the mirror relative to the stable body from which the mirror is mounted. The half angle drive system comprises a N-2N-speed synchro transmitter-receiver pair, with the N-speed synchro control transmitter mounted on the stable body axis, and the 2N-speed control receiver mounted on the mirror axis. This synchro transmitter-receiver pair is operable with a null error signal controlling mirror drive such that the angular rotation of the mirror is one-half that of the angular rotation of the stable body.

3 Claims, 5 Drawing Sheets

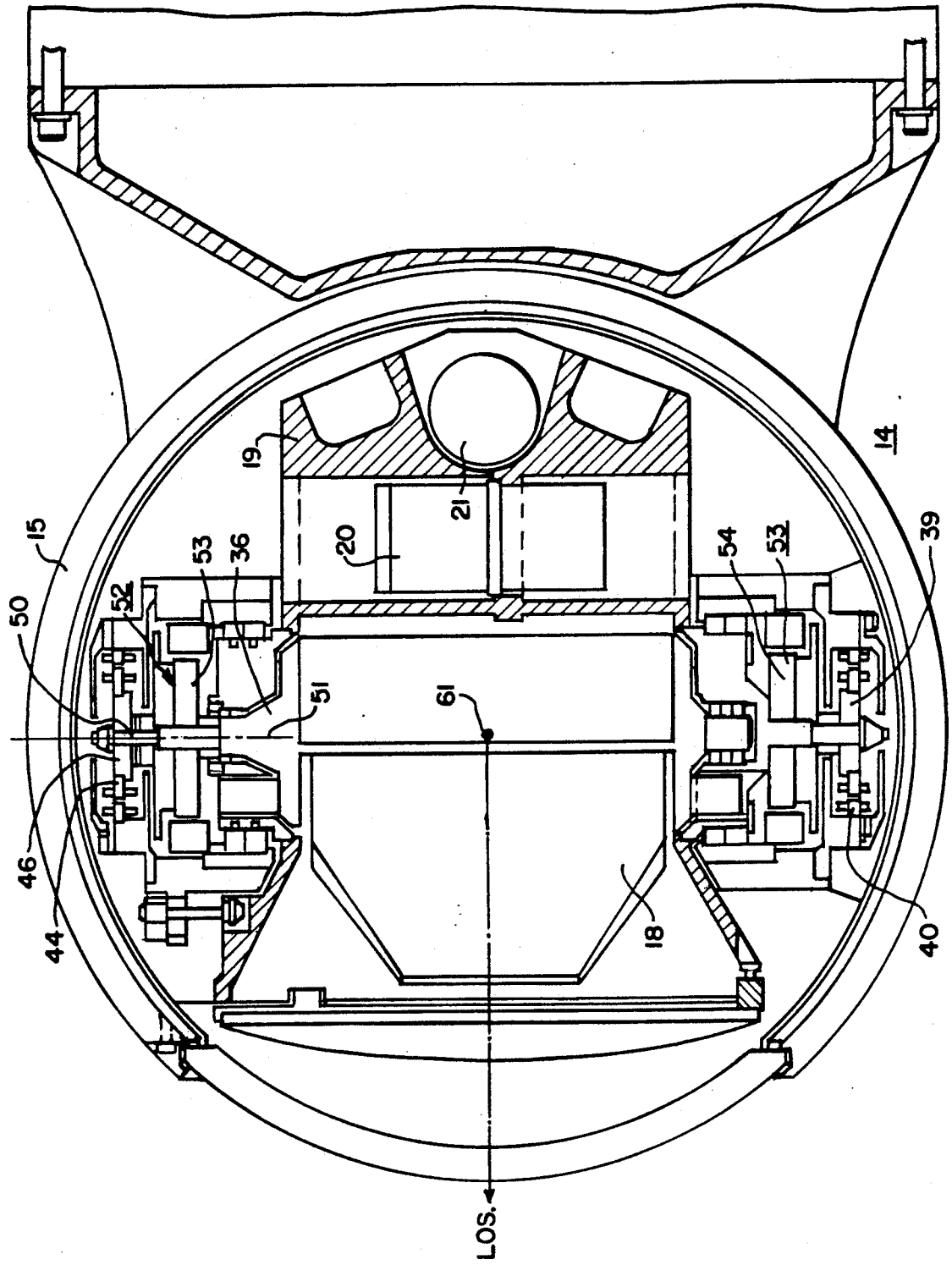

HALF ANGLE MECHANISM FOR A HELIOSTAT

The U.S. Government has a paid-up license in this invention and the right in limited circumstances to require the patent owner to license others on reasonable terms as provided for by the terms of contract No. F33615-78C-3022 awarded by the Air Force.

This application is a continuation, of application Ser. No. 06/417,750, filed Sept. 13, 1982, now abandoned.

BACKGROUND OF THE INVENTION

The present invention relates to heliostat assemblies, and more particularly to such assemblies used in electro-optical systems that are preferably adapted to be mounted in pods mounted from an air frame. The present invention is more particularly directed to the half angle drive system associated with a gimbaled mirror utilized in an electro-optical system for line-of-sight direction control. The function of an airborne heliostat electrooptical system is to provide a space stabilized line-of-sight direction capability relative to the movement of the aircraft.

A prior art stabilization system for stabilizing and maintaining a fixed line-of-sight of an optical instrument on an aircraft is described in U.S. Pat. No. 3,518,016. Such stabilization system utilizes a gimbal mounted mirror with a direct drive DC torque motor, and a pulley driven half angle drive mechanism which is gyro controlled. In other prior art, a stabilization sighting is set forth in U.S. Pat. 3,446,980, and deviations from the line-of-sight of an electro-optical system are sensed relative to a gyro spin axis, and correction signals are generated to drive the mirror and maintain the line-of-sight without the use of mechanical transfer mechanisms. Such system utilizes an autocollimating mirror to sense the deviations from the gyro spin axis, and includes correction signal means which are applied by a closed loop servo means to cause the line-of-sight to correspond to the gyro spin axis. Such electric mirror drive also utilizes half angle mechanisms for driving the mirror, but has the disadvantage of requiring a larger volume to accommodate the autocollimation function and required alignment difficulty. Such autocollimated systems have volume and configuration disadvantages because of the need for a retroreflector on the stabilized body, and the multiple optical paths required to generate the correction signals. As a result, the ratio of gimbal size to useful aperture is poor, and is generally a more complex system requiring processing of optical information to determine the error signal required to null the servo.

A heliostat which utilizes a two axis gimbal set with an elevational gimbal structure which is annular, and wherein an azimuth gimbal is also an annular structure, is set forth in copending application Ser. No. 268,546, filed May 29, 1981 and entitled "Improved Inertialy Dampened Heliostat Assembly", which application is owned by the assignee of the present invention. In such copending application, a belt driven half angle drive system is utilized which includes an inertial dampener fastened to the mechanical pulley drive mechanism which rotates the mirror. A further showing of typical half angle mechanical drive systems utilized in heliostats is seen in U.S. Pat. No. 3,951,510, also owned by the assignee of the present invention.

The aforementioned U.S. Pat. No. 3,951,510 and copending application both describe a mirror gimbaled in two axis for line-of-sight direction and stabilization in a pod mounted electro-optical system utilizing a mechanical half angle drive system for the mirror. A continuing source of angular error in such systems is due to the vibrational peaking of the mechanical drive system which is in part due to vibrational modes of the gimbal coupled to the mechanical half angle mirror drive. Error inducing vibration can result from air frame and pod vibration modes which are at the lower end of the frequency spectrum and result in base rotation of the gimbal set. It is this base rotation which must be exactly halved by the half angle mirror drive to maintain a fixed line-of-sight. Gimbal vibration modes cause mirror rotation without base rotation and thus serve to jitter the line-of-sight. An ideal mirror drive will respond to the base rotation with a conventional half angle correction, but reject motion caused by high frequency gimbal vibration modes. It is therefore desired to decouple the mirror shaft from the gimbal while continuing accurate response to base rotation.

SUMMARY OF THE INVENTION

An improved heliostat device for an electrooptical system comprises a mirror gimbaled in two axis for line-of-sight direction and stabilization. A half angle drive system is connected to the mirror for controlling azimuth rotation of the mirror relative to the stable base from which the mirror is mounted. The improved half angle drive system comprises a N-2N speed synchro-transmitter-receiver pair. The N-speed synchro controlled transmitter is mounted on the stable body axis, and a 2N-speed control receiver is mounted on the mirror axis. The half angle servo drive system includes control electronics coupled to the 2N-speed control receiver for generating a control signal which is combined with an error signal output from the transmitter-receiver pair to produce a null error signal when the angular rotation of the mirror is one half that of the angular rotation of the stable base.

BRIEF DESCRIPTION OF THE DRAWINGS

FIG. 6 is a side elevational view of the heliostat assembly of the present invention illustrating the two axis gimbal mounting system and half angle drive mechanism of the present invention;

DESCRIPTION OF THE PREFERRED EMBODIMENTS

Figure 1:
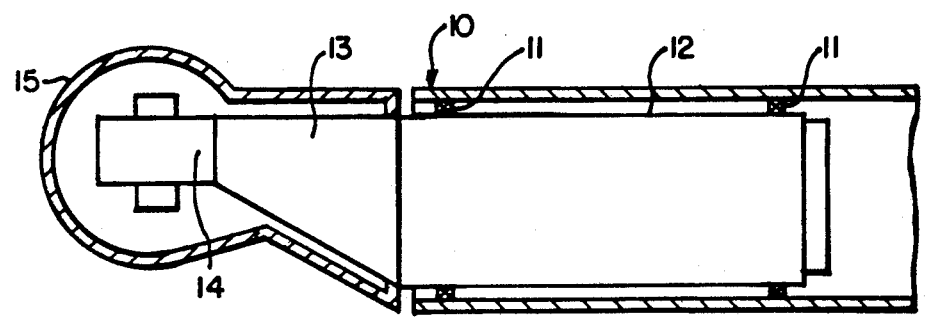
FIG. 1 is a schematic view of a pod in which the heliostat assembly of the present invention is adapted to be mounted.

The invention can be best understood by reference to the embodiment shown in the drawings wherein in FIG. 1, the electro-optical system of the present invention includes a generally cylindrical pod 10. A sensor mounting structure 12 is mounted within the cylindrical body of the pod 10 with a pair of axially spaced annular ball bearing assemblies 11 supporting this mounting structure 12 rotatably in the pod 10. Secured to one end of the mounting structure 12 is an optical assembly housing 13 to which is connected a two axis gimbal heliostat assembly 14 constructed in accordance with the present invention.

The forward end of the pod 10 is comprised of a transparent dome 15. The two axis gimbal 14 and the dome portion 15 provides the azimuth and elevation adjustment capability for stablizing the line-of-sight pointing direction of the electro-optical system. The optical assembly 13 is illustrated in schematic sectional plan view in FIG. 2 with portions of the heliostat 14 broken away to show elevational gimbal assembly 16, azimuth gimbal assembly 17, and stabilized body base structure 19. The heliostat device 14 is constructed for aiming a light source or image, or the like, along a line-of-sight such as indicated by the arrow marked LOS via a tilted rotatable planar input mirror 18 disposed within the azimuth gimbal 17. The heliostat device 14 is provided with an elevation gyro 20 and an azimuth gyro 21 that function to maintain the forward open end 22 directed toward a selected line-of-sight by the inertial action of such gyros operating in a well-known servo loop. The azimuth gimbal assembly 17 is pivotally mounted from the elevation gimbal assembly 16 for movement along a vertical mirror azimuth axis. The elevation gimbal assembly 16 in turn is mounted between a pair of support arms 24 and 25 extending from the stable base structure 19 for angular elevation movement about a horizontal elevation axis. The input mirror 18 is arranged relative to the elevation axis that such axis passes essentially through the forward reflecting face of the mirror at an angle of about 45°. Thus, even when the relative turning movement of mirror 18 about the elevational axis occurs as a result of the change in the elevation altitude of the pod 10, the face of the mirror 18 remains substantially in the same plane and undisturbed in respect to aiming a light input toward a fixed mirror 26 through opening 27 in the elevation gimbal assembly 16, and an opening 28 in the support arm 25. Ball bearing 29 permits rotation about the elevation axis. The optical assembly 13 includes a lens barrel portion 30 for supporting the fixed mirror 26. The input mirror 18 is arranged to move in azimuth about its mirror azimuth axis at one half the angular movement between the stable body 19 and the elevation gimbal 16.

Figure 2:
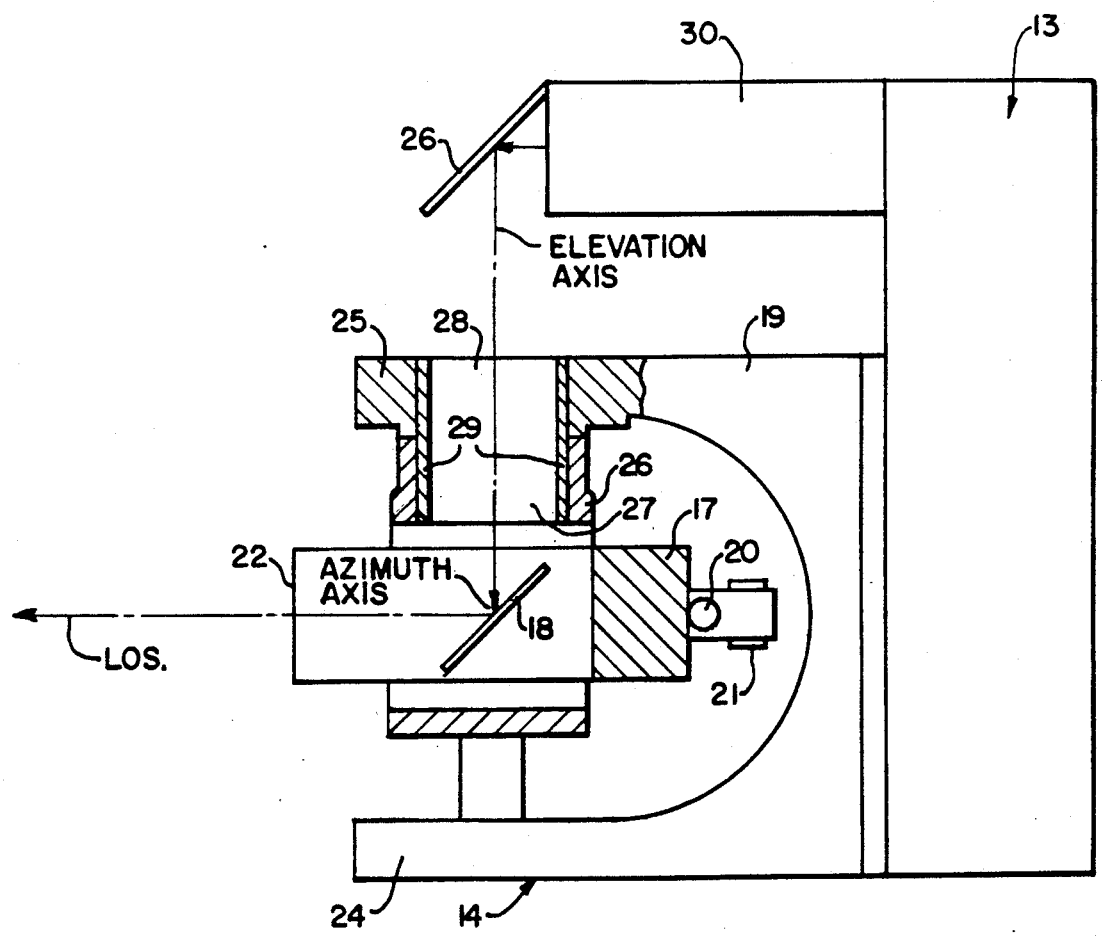
FIG. 2 is a schematic plan view partly in section of the assembly of FIG. 3.
Figure 3:
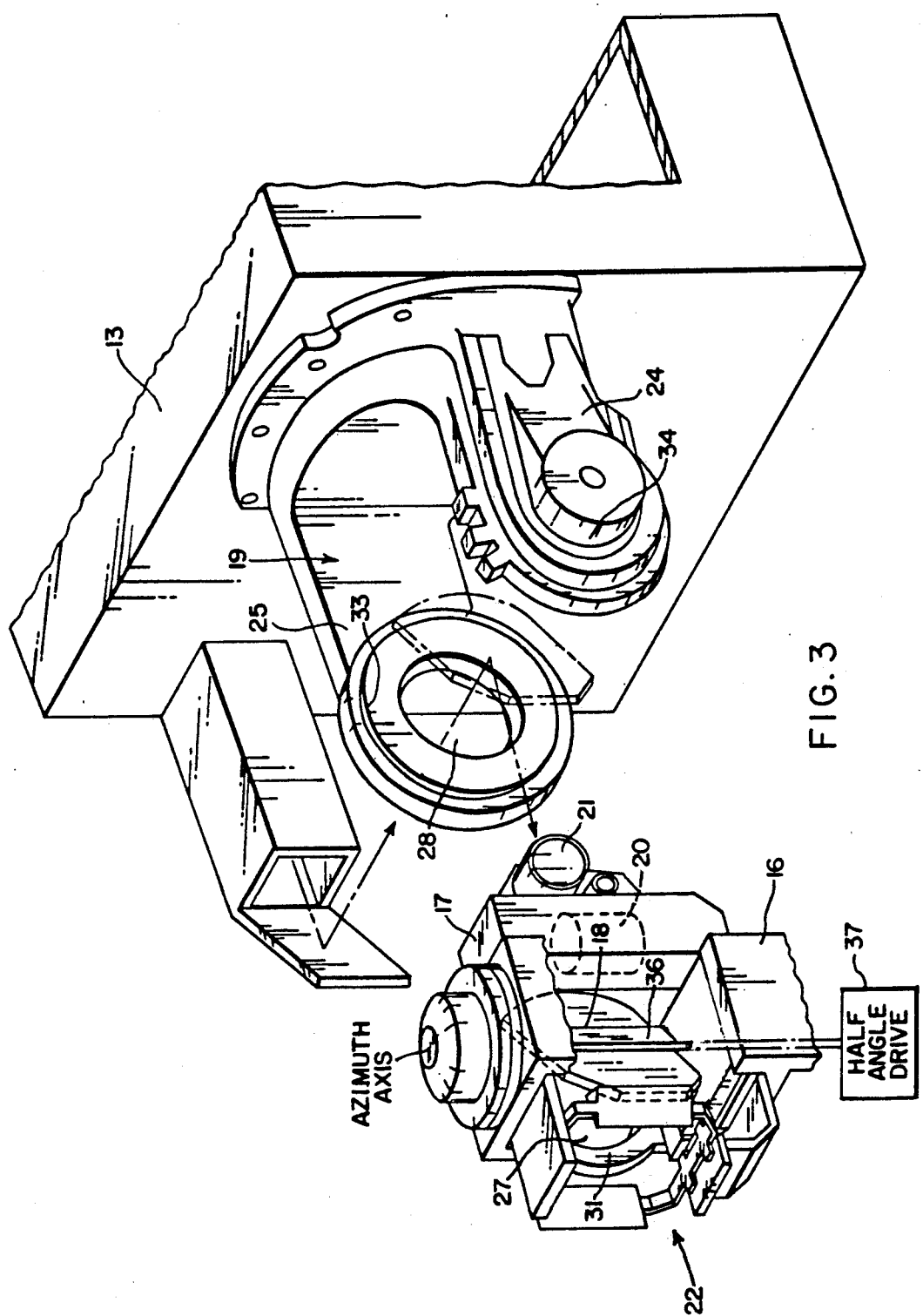
FIG. 3 is a view in perspective that is partially exploded and partially cut away to illustrate the heliostat assembly of the present invention.

The heliostat device 14 is illustrated in greater detail in FIG. 3 which illustrates the annular structures of the azimuth gimbal 17 and the elevation gimbal 16. The elevation gimbal assembly 16 rotates in elevation between the arms 24 and 25 of the base 19. The elevation gimbal 16 has a side wall 31, with a circular opening 27 therein, in which a semi-floating duplex preloaded ball bearing assembly is disposed in bore 33 to provide a bearing axis for the elevation gimbal. As seen in FIGS. 2 and 3, the line-of-sight LOS extends substantially coincidental with the elevation axis. The support arm 24 includes opening 34 into which a ball bearing assembly, not shown, fits to form the bearing axis and support for the elevation gimbal 16. The mirror 18 is mounted on a mirror shaft 36 which is substantially coincident with the vertical axis in azimuth. The mirror 18 is supported by the mirror shaft 36 which is in turn carried by the azimuth gimbal 17 by ball bearing system which is not shown. Mirror 18 is rotated by a half angle drive mechanism 37 which is connected to mirror shaft 36.

Figure 4:
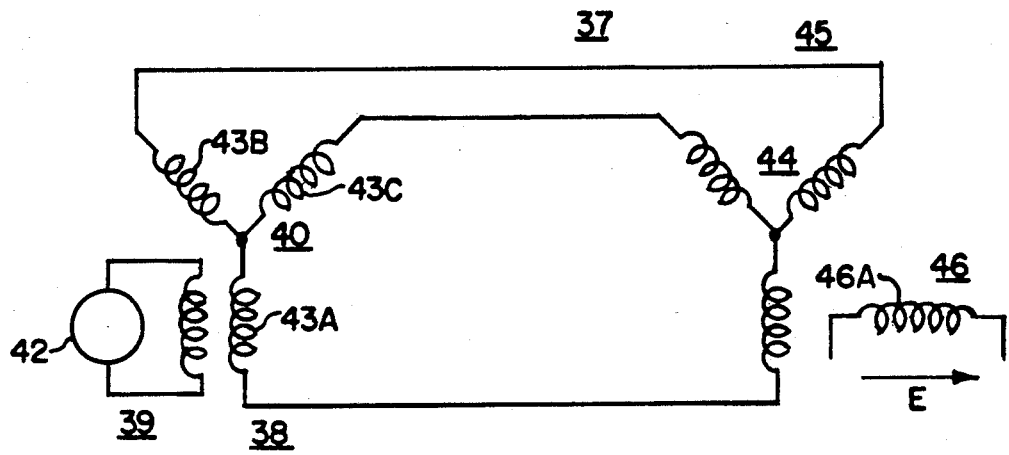
FIG. 4 is a system schematic representing the N-2N speed synchro half angle drive mechanism.
Figure 5:
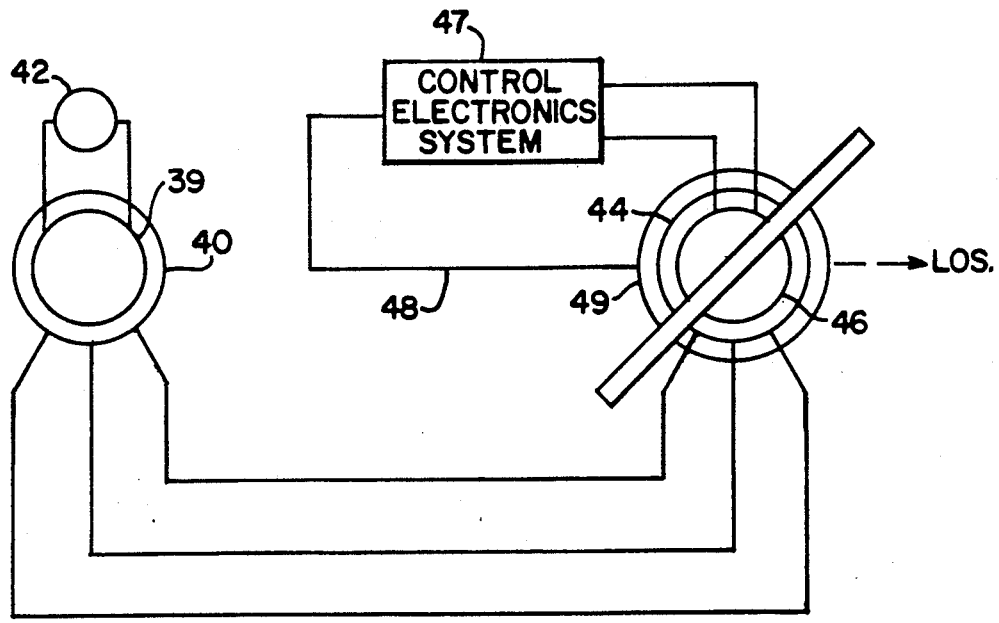
FIG. 5 is an alternative schematic representation of the synchro control drive mechanism of the present invention.

The half angle drive mechanism 37 of the present invention is illustrated in the two separate schematic illustrations of FIG. 4 and FIG. 5. In FIG. 4, the half angle drive mechanism 37 comprises an N-speed synchro controlled transmitter 38 mounted on the stable body axis, and comprises a rotor portion 39 and a stator portion 40. In FIG. 4, the rotor portion is illustrated as a coil 41 with an operating drive potential means 42 connected thereacross. The stator 40 of the N-speed transmitter 38 is illustrated by the three respective coils 43A, 43B, and 43C. Coil 43A is coupled to the rotor coil 41. The stator 40 of the N-speed transmitter 38 is electrically connected to the stator 44 of the 2N-speed receiver 45. The 2N-speed control transformer or receiver 45 is mounted on the mirror axis and is coupled to the 2N-speed rotor 46 which is illustrated as a coil 46A coupled to the stator 44. The output signal E of this transmitter receiver pair is defined by the equation $E = \sin(N\theta_{SB} - 2N\theta_M)$, where the output signal or error signal E is defined as a function of the angular change of the mirror which is defined as $\theta_{SB}$, and the angular change of the mirror which is defined as $\theta_M$. In the schematic illustration of FIG. 5, the error signal E generated by the 2N speed receiver rotor 46 is applied to control electronics means 47. The control electronic means 47 generates a feedback signal which drives the mirror torque motor until $\theta_M = \frac{1}{2}\theta_{SB}$, which is the half angle drive mechanism requirement, at which time the error signal E is zero or is nulled. The error signal E from the transmitter receiver drive mechanism 37 is electronically processed to create corrective torque motor commands. The feedback signal is illustrated as being applied in FIG. 5 via lead 48 which is connected to a schematically illustrated torque motor 49, which is illustrated as the outer concentric circle coupled to the 2N-speed transformer receiver 45. This closed loop action maintains the generated signal E at a null or zero when the half angle slaving function is realized.

Figure 8:
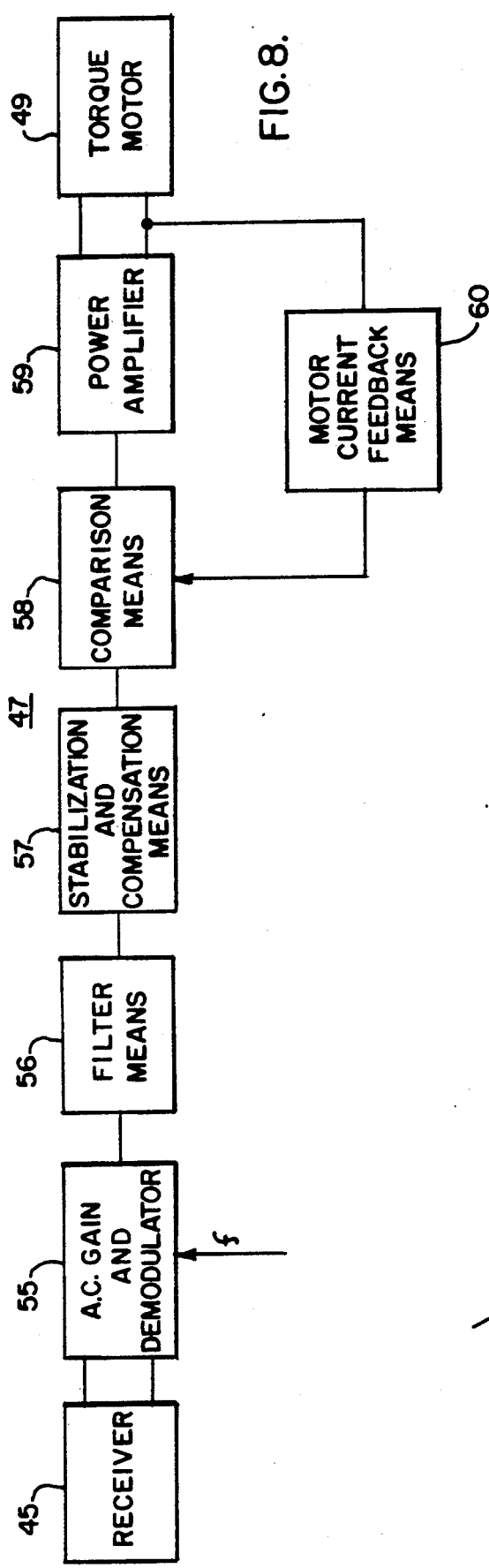
FIG. 8 is a block diagram schematic of the control electronics between the 2N synchro output and the torque motor utilized in the present invention.

The control electronics system 47 seen in FIG. 5 between the 2N synchro output and the torque motor 49 is illustrated in greater detail in FIG. 8 which is a block schematic. The control electronics system 47 comprises an a.c. gain and demodulation means 55 which is fed the 2N synchro output signal which is an amplitude modulated signal. This output signal has an amplitude proportional to the $\sin(N\theta_{SB} - 2N\theta_M)$ function and a carrier frequency given by the excitation of the N−2N synchro set. The 2N synchro output signal is amplified and demodulated by means 55 to achieve a d.c. analog signal. The carrier frequency signal is also fed to means 55. The output from means 55 is fed to narrow band notch filter means 56 to remove any noise associated with the demodulation process. The filter means 56 is centered at the fundamental f, and first harmonic 2f of the carrier frequency. The filtered signal output is fed to stabilization and compensation means 57 which controls the bandwidth and closed loop stability of the signal. The means 57 also provides transient recovery for the signal from a saturated condition.

The output signal from means 57 comprises a torque motor current command signal which produces a desired mirror acceleration. This torque motor current command signal is fed to comparison means 58 which is coupled to power amplifier 59 and to the torque motor 49. A feedback loop between the power amplifier 59 and the comparison means 58 via motor current feedback means 60. Actual motor current is sensed and fed via feedback means 60 to comparison means 58 and compared to the torque motor current command signal. The comparison means 58 output signal is a difference signal which is fed to the power amplifier to force motor current into agreement with the command. The mirror acceleration is thus controlled in a manner which nulls the 2N synchro output and forces the mirror angular displacement to one-half the stable body angular displacement.

Figure 7:
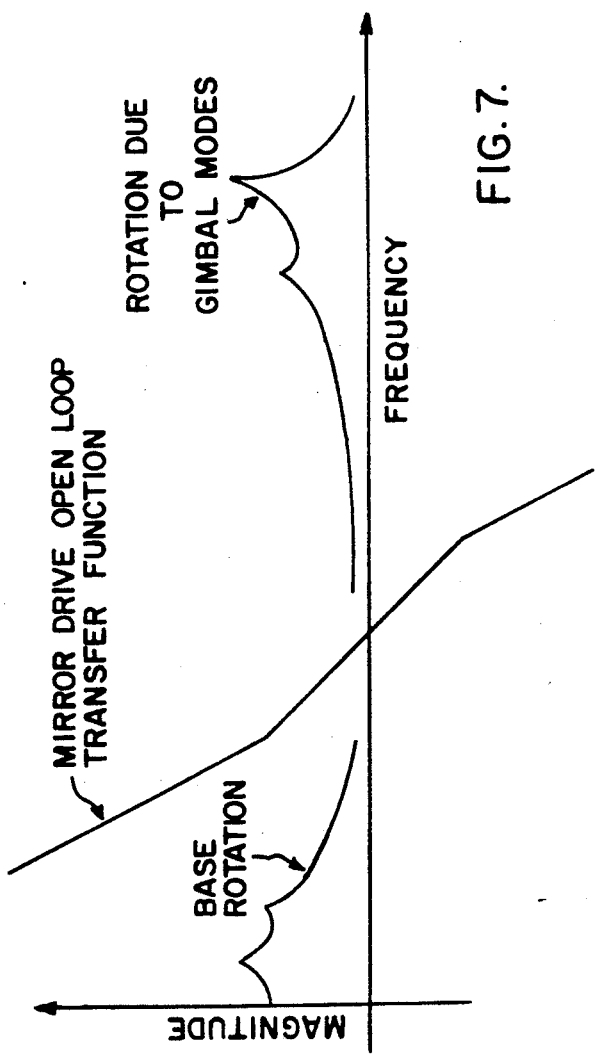
FIG. 7 is a plot of the drive characteristics of the half angle drive system of the present invention in which magnitude of vibrational displacement is plotted against frequency of vibration.

The drive characteristics of the half angle drive mechanism of the present invention are illustrated in FIG. 7, wherein the magnitude of displacement is plotted against frequency of displacement. The base rotation is seen to be a low frequency, typically 10 to 40 Hertz vibration modes associated with air frame and pod movement, whereas rotation due to gimbal modes are seen as relatively high frequency displacements.

The N speed-2N speed synchro control transmitter-receiver pair, half-angle drive mechanism of the present invention operates at a high gain at low frequency to thereby minimize error due to base rotation, while exhibiting a low gain at high frequency and minimizing of error due to gimbal modes. This drive mechanism will in effect respond to the base rotation while rejecting motion caused by the higher frequency gimbal motion vibration modes. The change from a mechanical half angle drive mechanism to the present synchro control mechanism provided by this invention raises the frequency of the vibration modes that affect the line-of-sight by a factor of 4 to 5 in current gimbal systems. As seen in FIG. 7, a relatively benign region between the high gain and the low gain frequency ranges is provided for the N-2N speed synchro transmitter-receiver pair and can be used to locate the open loop crossover frequency of the electric drive.

In the embodiment seen in FIG. 6, the heliostat 14 of the present invention is disposed within dome 15 with the line-of-sight illustrated by the line LOS. The rotatable mirror 18 is supported from a mirror shaft assembly 36. The elevation gimbal assembly 16 provides the freedom to rotate about the elevation axis 61 which is directed normal to the plane of the drawing. The stabilized body 19 is free to rotate about the azimuth axis with ball bearing means provided between the stable body 19 and the elevational gimbal 48. An elongated mirror drive shaft 50 extends along the azimuth axis 51. A mirror torque drive means 52 has a rotor 53 coupled to the mirror drive shaft 50 and the elevation gimbal 16. The stator 44 of the 2N-speed transformer is also attached to the elevation gimbal 16, and the 2N-speed rotor 46 is also coupled to the mirror shaft drive 50. Thus, all torques are reacted against the elevation gimbal and the angles are measured with respect to the elevation gimbal. A stabilized body torque means 53 is seen at the lower half along with the N-speed transmitter portion of the half angle drive mechanism. The rotor 54 of the stable body torque means and the N-speed rotor 39 are connected to the stabilized body 19. The stator portion of the stable body torque means and the N-speed stator 40 are coupled to the elevation gimbal.

The improved half angle drive mechanism of the present invention permits efficient packaging of the heliostat mechanism within the pod dome, with the improved performance capability inherent in use of a servo control loop to perform the half angle function. This mechanism allows low Q, frequency controlled, decoupling between the drive mechanism and the mirror. The drive mechanism is inherently decoupled from the gimbal vibration modes which would otherwise couple through a mechanical drive mechanism to cause line-of-sight jitter. The N-speed-2N-speed transmitter-receiver synchro pair should have an accuracy requirement of the synchro system error reference to a stable body of about 1 minute per 6.7 degrees, which is well within manufacturer capabilities. Absolute angle accuracy on the order of ±3 minutes for the transmitter-receiver pair will produce the desired half angle transfer mechanism. By way of example, the N-2N speed transmitter-receiver synchro pair are available from Clifton Precision Division, Litton Systems, Inc.

We claim:

1. An improved heliostat device for an electro-optical system comprising:
 a mirror gimbaled in two axes with the mirror supported from an azimuth gimbal pivotally mounted from an elevation gimbal for line-of-sight direction and stabilization, with a half angle drive system connected to the mirror for controlling azimuth rotation of the mirror relative to the stable body from which the mirror is mounted and which half angle drive system includes torque motor means coupled to the mirror for controlling rotation of the mirror;
 the improvement wherein the half angle drive system comprises an N-2N-speed synchro transmitter-receiver pair in which the output signal from the 2N synchro control receiver has an amplitude proportional to sin $(N\theta_{SB} - 2N\theta_M)$, with an N-speed synchro control transmitter comprising a transmitter stator and transmitter rotor, with the transmitter stator coupled to the elevation gimbal, and the transmitter rotor coupled to the stable body, and a 2N-speed synchro control receiver comprising a receiver stator and receiver rotor, with the receiver stator coupled to the elevation gimbal and the receiver rotor coupled to the mirror drive shaft, with the torque motor means coupled to the mirror drive shaft, which half angle drive system includes control electronics coupled between the 2N-speed synchro control receiver and the torque motor means, with the synchro control receiver output signal applied as a torque motor current command signal fed to the torque motor means, and wherein the control electronics includes means for comparing the torque motor current command signal to the actual torque motor current such that a null signal difference is provided when mirror angular displacement is one-half the stable body angular displacement.

2. The improved heliostat set forth in claim 1, wherein the heliostat is disposed within a pod which is connectable to an aircraft.

3. The improved heliostat set forth in claim 1 wherein the heliostat is provided with elevation and azimuth gyros which function to direct the heliostat along a selected light of sight.

* * * * *